Oct. 5, 1926. 1,602,090
A. J. WEST
INTERNAL COMBUSTION ENGINE
Filed Feb. 21, 1924 4 Sheets-Sheet 2

INVENTOR
Arthur Jackson West.
BY
A. B. Reavis
ATTORNEY

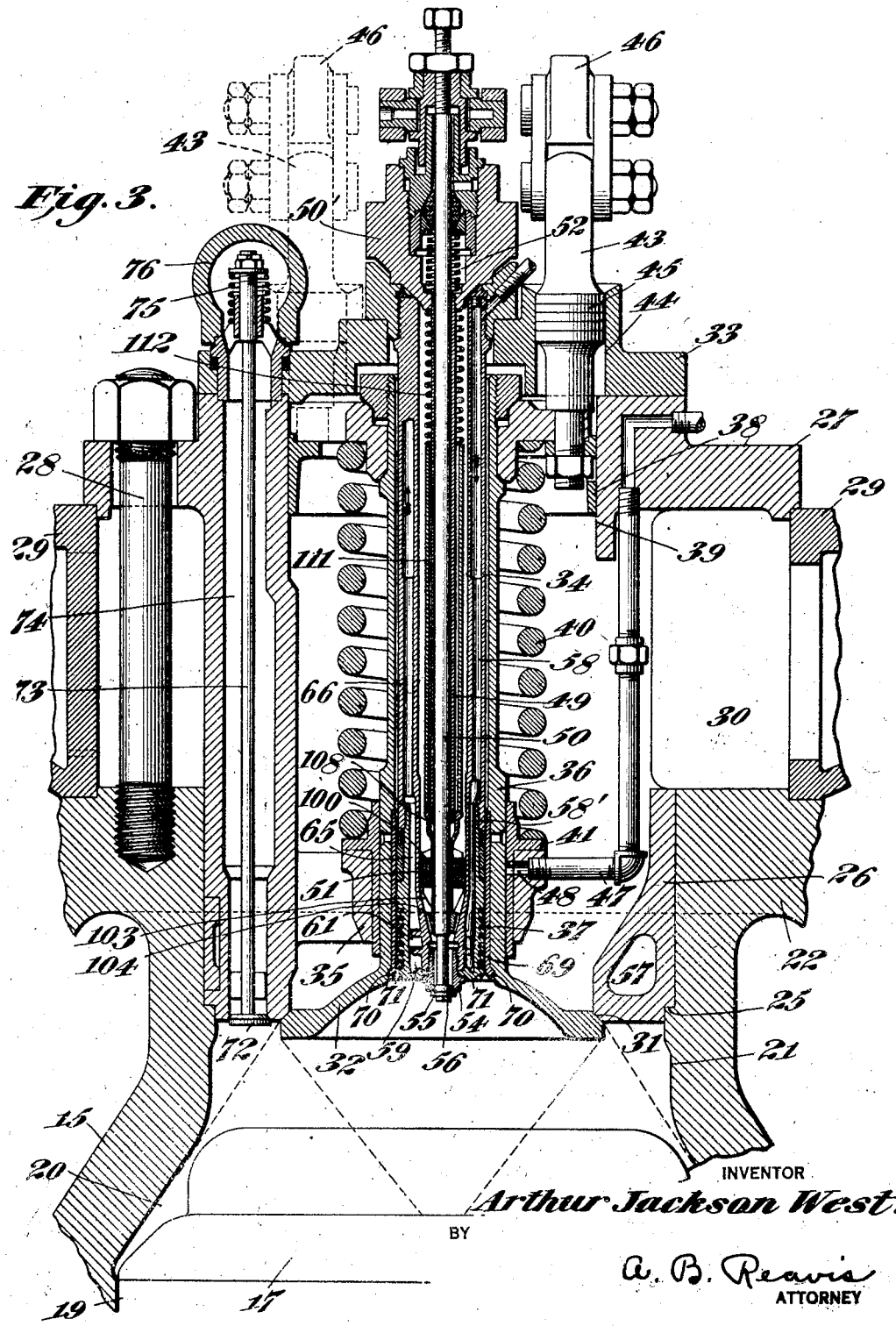

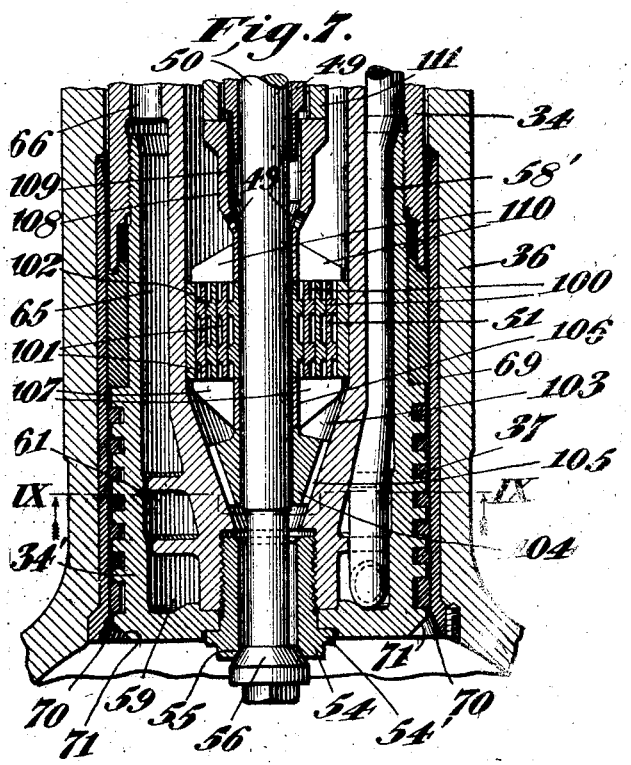
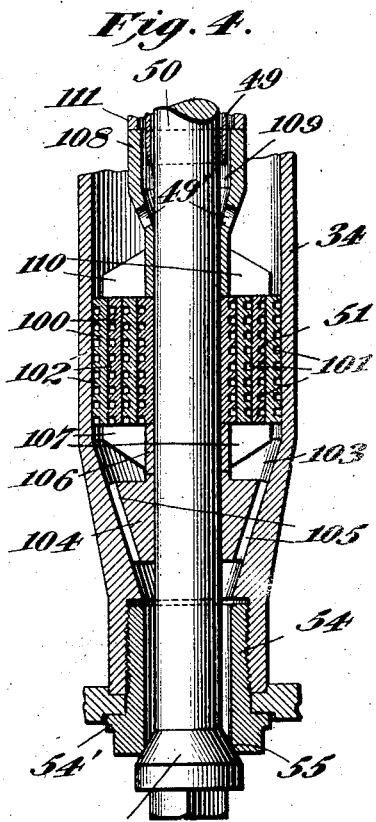
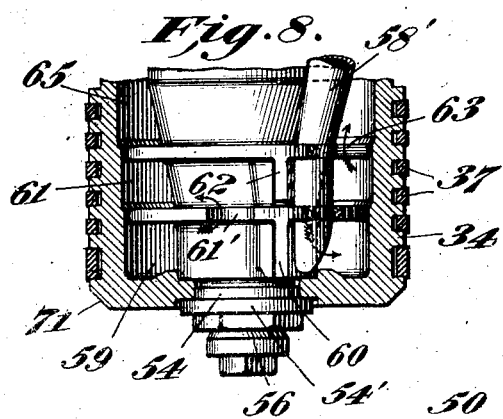
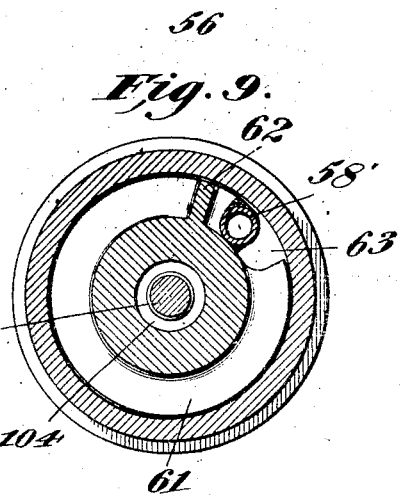
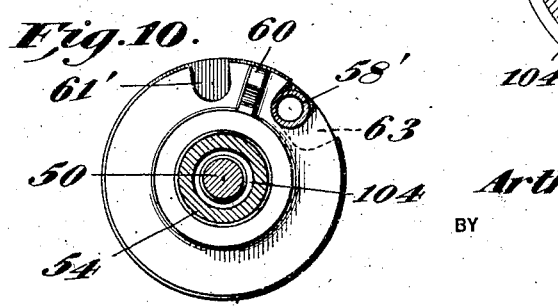

Patented Oct. 5, 1926.

1,602,090

UNITED STATES PATENT OFFICE.

ARTHUR JACKSON WEST, OF BETHLEHEM, PENNSYLVANIA, ASSIGNOR TO BETHLEHEM STEEL COMPANY, OF BETHLEHEM, PENNSYLVANIA.

INTERNAL-COMBUSTION ENGINE.

Application filed February 21, 1924. Serial No. 694,231.

This application is a continuation in part with respect to subject matter divided from my application, Serial No. 422,753, filed Nov. 9, 1920.

My invention relates to internal combustion engines, more particularly to engines of the slow-burning or Diesel type, and it has for an object to provide a unitary construction of valves whereby a good design of engine cylinder may be provided for.

A further object of my invention is to provide a valve cage for an engine which shall include co-axially arranged scavenge air and fuel injection valves, which are independent of each other in operation.

A further object of my invention is to provide a hollow valve cage which is generally cylindrical in form, the cage being provided with a valve seat at its lower end and the cage having a centrally depending stem, together with a scavenge air valve slidably arranged with respect to the stem and with a fuel injection valve arranged interiorly of the stem.

A further object of my invention is to provide a valve cage for an engine having an annular scavenge air valve surrounding a tubular housing which contains the fuel injection valve.

A further object of my invention is to provide a valve cage construction for an engine having co-axially arranged fuel injection and scavenge air valves, together with air starting and testing and relief valves disposed laterally of the scavenge air and the injection valves.

A further object of my invention is to provide a valve cage construction for an internal combustion engine having water-cooled seats for the scavenge air and fuel injection valves.

A further object of my invention is to provide a dome-shaped scavenge valve, thereby making it more durable.

As set forth more particularly in my application aforesaid, the two-cycle type of slow-burning or Diesel engine has heretofore not been entirely satisfactory owing to parts of the cylinder, particularly the wall portion surrounding the initial combustion space, becoming overheated. Also such prior constructions have usually incorporated cylinders of unsymmetrical design whereby expansion and contraction could not take place in a symmetrical manner, resulting in internal stresses and possible breaking or cracking of parts. Cylinders have frequently failed owing to possible weakening of the material thereof where most highly heated due to the fact that the designs were such as not to permit of the degree of cooling which I attain with my improved construction. In my application aforesaid, I disclose and claim a type of engine cylinder which is symmetrical in design, that is, it is generally bottle-shaped in outline and has an annular overhanging jacket member connected to the upper end of the cylinder. The contracted combustion space is advantageous for the reasons that, for the same volume, greater area in stress is provided and, therefore, greater capacity to stand up under high temperatures exists as compared to an engine having a bore which is cylindrical throughout. Another desirable feature of my improved type of engine cylinder is the entire absence of ports and passages in the head end for valves, the interior of the neck portion of my improved cylinder being adapted to receive a valve cage, the latter containing the scavenge air, fuel injection, air starting, and pressure relief and testing valves. The water jacket comprised in part by the annular overhanging member extends well above the lower end of the cage and the scavenge air valve is so arranged as to discharge an annular column of air whose outside passes in contact with the flaring interior surface of the contracted combustion space, whereby the wall of the contracted combustion space, which is the most highly heated portion of the cylinder wall, is effectively cooled by cooling water on the outside and by scavenging air interiorly. The scavenging air is not only discharged into a diverging annular column but is uniformly dispersed or diffused throughout the engine cylinder whereby products of combustion are effectively expelled through exhaust ports arranged near the lower end. It will, therefore, be seen that my improved valve cage arrangement containing all of the necessary valves for an engine cylinder is particularly desirable with the design of cylinder disclosed and claimed in my application aforesaid.

My valve arrangement includes co-axial fuel and scavenge valves which are independent in structure and operation. This is an important improvement over the prior art which shows a dependent relation of these valves for the reason that, with the latter arrangement, any unequal wear of the valves or seats or disturbance of the relative adjustment of the valves results in improper operation, inoperativeness, or possible burning out of valves and seats.

Apparatus made in accordance with my invention is illustrated in the accompanying drawings, forming a part of this application, in which:

Figure 3 is a sectional view of my valve cage and valves;

Figure 4 is a fragmentary view showing a preferred form of atomizer also shown in Figures 3 and 7;

Figures 7 to 10, inclusive, are detail views, Fig. 9 being a section along the line IX—IX of Fig. 7, showing my improved cooling arrangement for the lower end of the central stem structure, and Fig. 7 showing my preferred type of atomizing construction.

Figure 1:
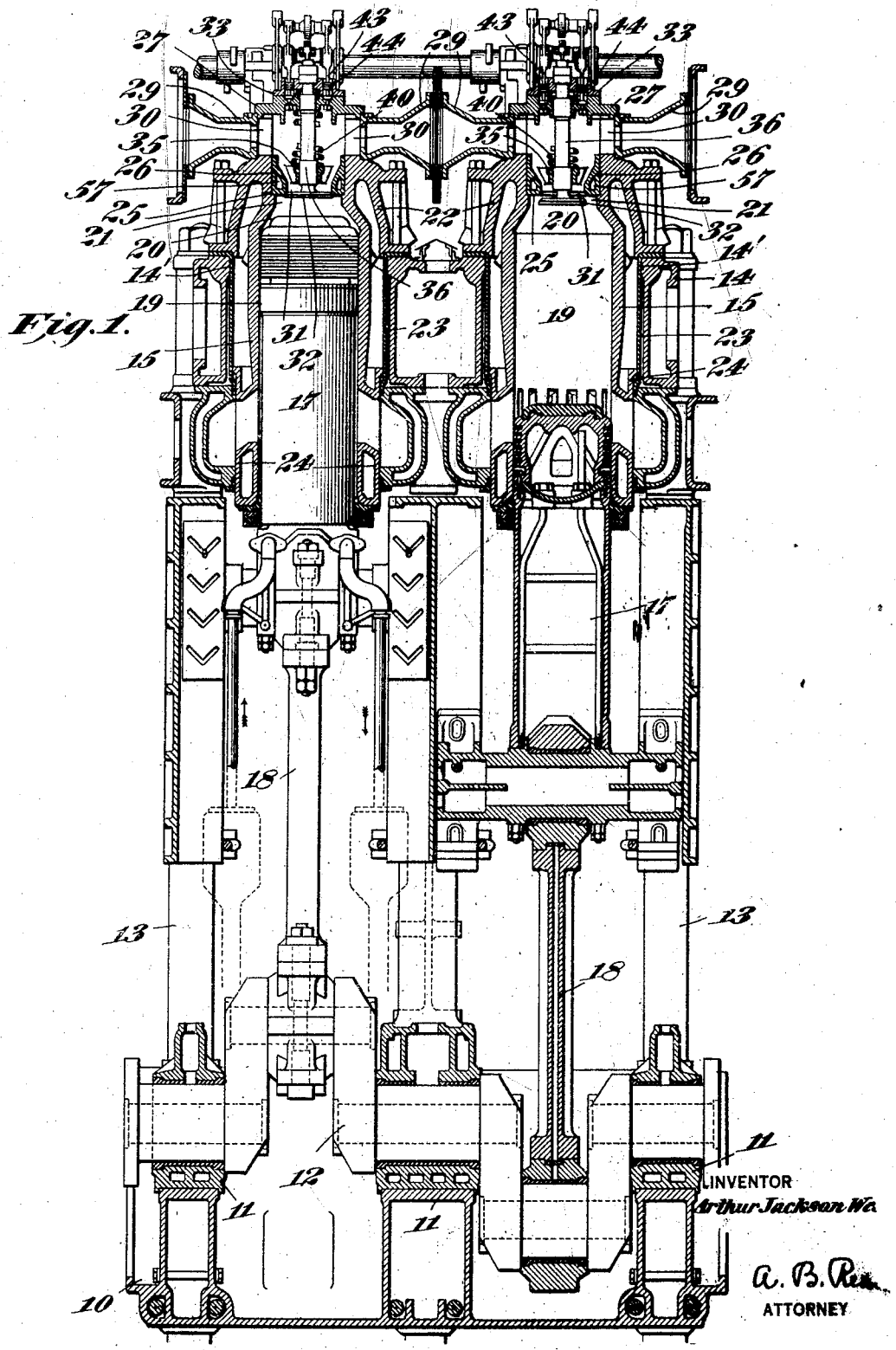
Figure 1 is a sectional view of a portion of an engine showing fragmentarily my improved valve cage.

Referring now to the drawings for a detailed description of my invention, in Figure 1, I show an internal combustion engine includng a crank casing 10 having bearings 11 for supporting a crank shaft 12. Frame members 13 are arranged above the crank casing and they support tabular members 14 having openings 14' to receive cylinders 15 having pistons 17 therein connected to connecting rods 18 which engage the crank shaft.

The engine cylinders 15 are generally bottle-shaped in outline, that is, each cylinder comprises a cylindrical bore portion 19, a flaring portion 20 above the cylindrical bore portion and a neck portion 21, the outer end of the neck portion being connected to an overhanging jacket member 22 which is adapted to rest upon and be connected to the tabular support 14. A jacket member 23 is arranged contiguously to the lower end of the overhanging member 22 and such jacket member is telescopically arranged with respect to an upstanding jacket portion 24 integral with and surrounding the lower end of the cylindrical bore portion 19. The engine construction and the design of cylinders so far described are disclosed and claimed in my application aforesaid and a further description thereof is deemed to be unnecessary.

Each neck portion 21 is provided interiorly with a shoulder 25 upon which is adapted to rest a hollow valve cage 26, the latter having near its upper end an outwardly-extending flange 27. The flange 27 is adapted to be bolted to the cylinder head by bolts 28 (Fig. 3) thereby clamping an air supply chamber 29 between the flange 27 and the head of the cylinder.

The valve cage is hollow and it has a lateral inlet means 30 in communication with the air supply chamber 29 and it terminates at its lower end in a valve seat 31 for a scavenge air valve 32 to be described.

The cage 26 is provided with a cover 33 which has secured thereto a cylindrical stem or sleeve member 34 (Fig. 3), preferably arranged co-axially with respect to the cage. Near its lower end the cage is provided interiorly with a bearing 35. The scavenge air valve 32 surrounds the sleeve member 34 and it is provided with a sleeve extension 36 which slidably engages the bearing 35 and has a fluid tight fit with respect to the lower end of the sleeve 34, any suitable packing 37 being used for this purpose. At its upper end, the sleeve extension 36 of the scavenge air valve is connected to a piston member 38 fitting within a cylinder portion 39 of the cage, a spring 40 being arranged below the piston and abutting a shoulder 41 carried by the bearing 35. Rod members 43 are connected to the piston and extend above the latter and through opening 44 in the cover 33, the rod members having fluid tight piston portions 45 fitting the openings to prevent the escape of air from the cage. The rod members 43 are connected to levers 46 which are operated by any suitable mechanism operating in timed relation with respect to the engine and which it is unnecessary to show. It will be apparent that the annular scavenge air valve 32 is moved away from its seat due to the action of the levers 46 operating on the rods 43 to push the piston 38 down, thereby compressing the spring 40. As soon as the lever 46 is free to move in the opposite direction the spring 40 is effective to move the scavenge air valve 32 in a closing direction, the piston 38 giving a dash-pot effect to such closing.

As may be seen from Figure 3, the scavenge valve 32 is dome-shaped in order to produce a valve of requisite strength while at the same time avoiding undue thickness. In practice it has been found that a scavenge valve comprised by a flange portion extending radially from the sleeve 36 would not stand up but would rupture in the vicinity of the sleeve 36. A dome-shaped valve, such as illustrated, was therefore devised with the result that a very durable construction has been obtained. This may be explained generally on the basis that a flat valve is submitted to the cumulative effect of parallel forces acting lengthwise of the engine cylinder, whereas the dome-shaped valve, being substantially an element of a sphere, is submitted to radially acting forces which stress the material more uniformly without undue concentration of stresses and consequent rupture as occurs with the flat type of valve.

In order that the bearing portion of the scavenge air valve may be properly lubricated, I show a lubricant supply conduit 47 which communicates with a port 48 in the bearing 35.

A sleeve 49 is arranged interiorly of the sleeve member 34 and a valve stem 50 is arranged interiorly of the latter sleeve. The sleeve 49 and the stem 50 are carried by a supporting member 50' connected to the cover 33. The inner sleeve terminates at a point above the lower end of the sleeve member 34 so as to provide space for a suitable atomizer 51, hereinafter more particularly described. The annular space between the stem 50 and the sleeve member 49 communicates with a chamber 52, which, in turn, communicates with the oil inlet passage 52' and the annular space between the sleeve members 34 and 49 communicates with an air inlet passage 53 (see Fig. 2). Oil is forced into the annular passage between the valve stem 50 and the sleeve member 49 and it passes down and through the openings 49' to the atomizer 51, air also being forced under pressure to the atomizer through the air inlet passage 53 and the annular passageway between the sleeve members 34 and 49. Below the atomizer, the outer sleeve member 34 is provided with a valve seat ferrule 54 having a valve seat 55 which cooperates with a valve 56 carried by the valve stem 50. Any suitable packing is arranged about the upper end of the valve stem 50 to prevent leakage and such valve stem is moved by any suitable operating mechanism in order that the valve may be opened to supply atomized fuel to the engine cylinder and closed to cut off such supply.

As the valve seat portion 31 of the scavenge air valve is submitted to intense heat it is desirable that the latter be water cooled. The cage member is, therefore, provided with a circumferentially-extending water-cooling space 57 adjacent to the seat portion 31.

It is desirable that the stem or sleeve 34 be water-cooled in order to prevent possible cracking as dissociation of oil above the injection valve 56. To this end, I show such stem provided with a longitudinal inlet passageway 58 communicating with a tube 58' leading to the bottom of the stem member and communicating with a circumferentially-extending passage 59, the latter passage having a diaphragm 60. Above the circumferential passage 59 is a second circumferential passage 61 and the latter communicates by way of a port 61' with the circumferential passage 59 at the side of the diaphragm 60 opposite to the discharge end of the tube 58'. In like manner, the second circumferential passage 61 is provided with a diaphragm 62, the latter diaphragm being arranged between the port 61' which connects the two circumferential passages and an outlet opening 63, through which the tube 58' preferably passes. It will, therefore, be seen that water enters the inlet passageway 58 and flows through the tube 58' to the bottom of the stem member, passes around the lower circumferential passage 59, then by way of the port 61' enters the upper circumferential passage 61, and passes in the reverse direction therein after which it is discharged through the opening 63, which communicates with the annular space 65, the latter communicating with the discharge passage 66. The directions of flow are indicated by the arrows in Fig. 8. This structure assures that cooling water shall flow directly to the bottom of the stem or sleeve member construction 34 to cool the portion thereof exposed to the combustion space. The arrangement of circuitous passageways provides continuous forced circulation of cooling water at the lower end of the stem or sleeve member without the formation of stagnant or dead spaces or the cross flow of water well above the bottom of the stem.

Upon reference to Figure 3, it will be seen that the sleeve extension 36 of the scavenge valve 32 is provided with a bushing 69 which is slidable with respect to the interior sleeve or stem member 34. The lower and contiguous edges of the bushing 69 and of the sleeve member 34 are beveled at 70 and 71 respectively, in order that carbon formations may be readily loosened at the lower end of such bushing and the stem or sleeve member.

In addition to the scavenge and injection valves, I show the cage provided with an air starting valve 72 having a stem 73 extending through an air supply passage 74, the stem being normally forced upwardly by a spring 75 arranged within the housing 76 in order to move the valve 72 toward its seat. Air under pressure is supplied to the housing 76 in any suitable manner, the pressure of such air opening the valve 72 against the tension of the spring 75 for starting purposes.

Also, I provide another valve disposed laterally of the scavenge valve which serves as a relief valve, as a means for taking indicator cards, and as a means for relieving the cylinders of pressure when the engine is being started. This valve comprises an upwardly opening valve portion 78 cooperating with a seat 79 arranged at the lower end of the passage 80. The valve portion 78 is carried by a valve stem 81 which extends up through the passage 80 into a housing structure 82 carried by the cover 33 and through a cylinder 83 connected to the housing structure. The housing structure 82 includes a chamber 84 in communication with the passage 80 and which has an upper valve seat 85. A passage 86 communicates with the chamber 84 below the seat 85 and such passage is adapted to communicate either with the atmosphere or with suitable indicating means. Above the valve seat 85 the housing structure 82 is provided with a cylinder 87 within which is located a piston 89 carried by the valve stem 81. A larger piston 90 is carried by the valve stem 81 and it is arranged within the cylinder 83. A spring 91 abuts at its lower end against the upper side of the piston 90 and at its upper end it is seated against a member 92 which in turn bears against the threaded hub portion 93 of a hand wheel 94, the threaded hub portion engaging interior threads 95 at the upper end of the cylinder 83. A passage 96 is provided in the housing structure 82 for supplying compressed air to the cylinder 83 below the piston 90.

As a safety valve the structure just described operates as follows: Excess pressure from an engine cylinder acts against the exposed bottom of the valve 78 and raises the latter against the force of the spring 91, permitting pressure fluid to pass through the passageways 80 and 86 to the atmosphere. When the apparatus is operated to take indicating cards, the hand wheel 94 is operated to raise the stem 81 by contact with the nut arranged thereabove until the valve member 98 carried by the stem end in the chamber is seated against the seat 85, whereupon there is free communication between the engine cylinder and the pressure responsive element of the indicator device by way of the passages 80 and 86. In order to relieve pressures in cylinders when the engine is started, compressed air may be supplied to the passageway 96 to act on the lower face of the piston 90, thereby raising the valve 78 and permitting cylinder pressure to be relieved by way of the passages 80 and 86, the latter passage communicating with the atmosphere.

Figures 2, 5, 6:
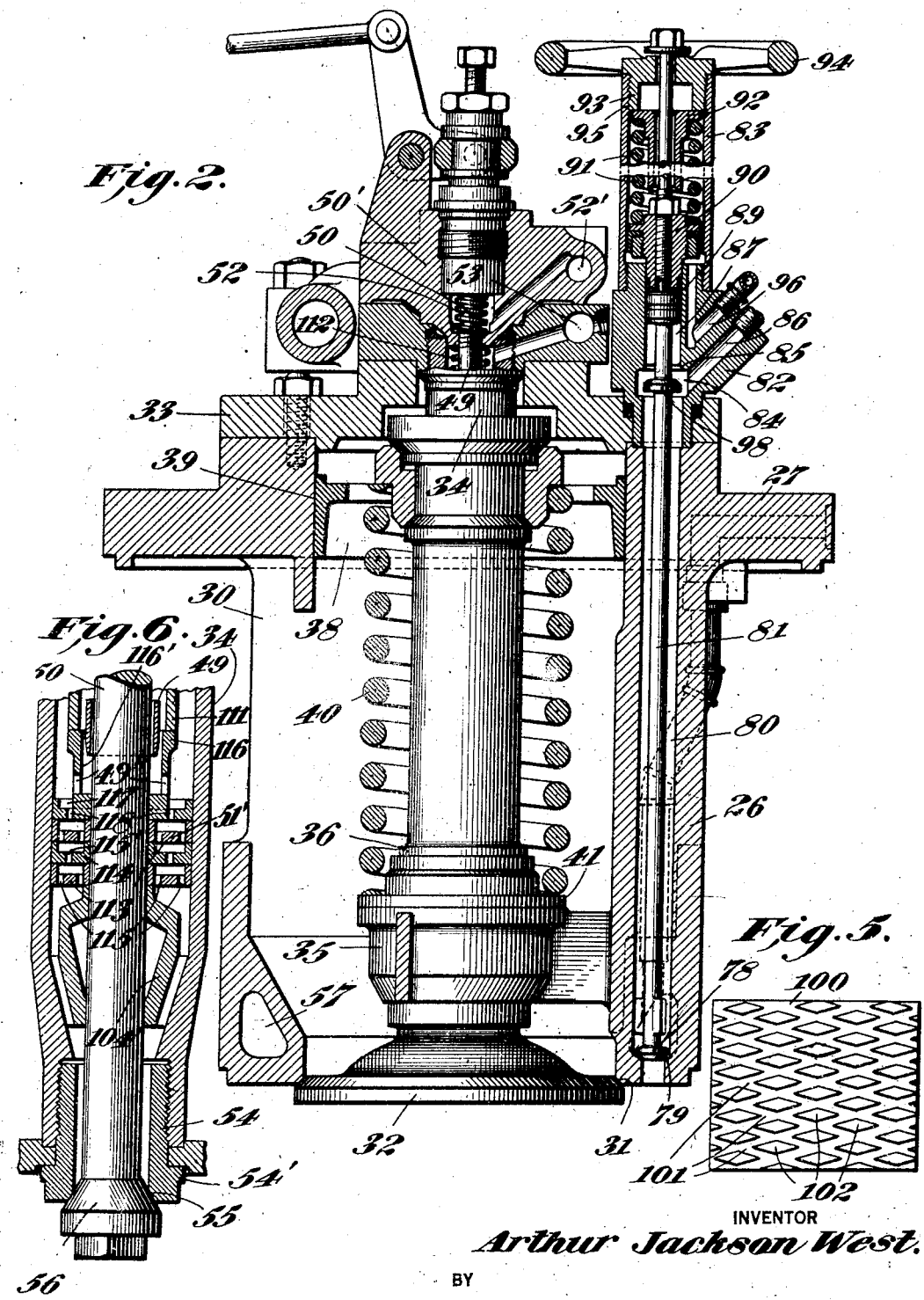
Figure 2 is a sectional view of a valve cage with the scavenge valve and stem construction shown in elevation.
Figure 5 is a detail view of one of the atomizing elements shown in Figures 3, 4 and 7.
Figure 6 is a detail view showing a modified form of atomizer.

Referring now more particularly to the atomizer structure, this is shown more in detail in Figures 4, 5 and 7, a modified form being shown in Figure 6. The atomizer at 51 preferably consists of a plurality of coaxial sleeves 100 having helical grooves or slots 101. As illustrated in Figure 5, the helical grooves or slots are preferably inclined in two directions so as to intersect and define diamond shaped projections 102. When assembled, the sleeves 100 fit against each other so as to cover the grooves or slots, thereby defining atomizer passageways. Below the sleeves 100, the interior of the depending sleeve or stem member 34 converges at 103 and a head or plug member 104 seats against the interior converging wall 103, the head or plug member being preferably provided with spiral grooves 105 covered by the wall 103 and which operate as discharge passageways for the mixture received from the sleeves 100. A spacing member 106 is arranged between the head or plug member 104 and the nested sleeves 100, such spacing member 106 being provided with fins 107 which support the sleeves. Above the sleeve 100 there is disposed a sleeve or spacing member 108 having its upper portion spaced from the valve stem 50 in order to define a chamber 109 in communication with the annular passageway between the stem 50 and the sleeve 49, the chamber 109 having the discharge openings 49' at the bottom thereof as already referred to. Adjacent to the sleeve members 100, the spacing sleeve 108 is provided with fins 110 which rest on the nested sleeve. The upper end of the spacing sleeve 108 contacts with a sleeve member 111 which extends upwardly within the interior of the hollow depending sleeve or stem member 34 and contacts with a spring 112 seated against the member 50'. The spring 112 acts to press the sleeve member 111 downwardly, the latter member acting through the spacing sleeve member 108 to keep the atomizer sleeve 100 in place and the head member 104 firmly seated.

From the structure described, it will be apparent that fuel oil enters the passageway 52', enters the chamber 52, and passes down between the valve stem 50 and the sleeve 49 into the chamber 109 from which it passes by the openings 49' to the space above the nested atomizer sleeves 100. Injection air enters the passage 53 and passes down between the interior wall of the depending sleeve or stem member and the intermediate sleeve member 49 to the space immediately above the nested atomizer sleeves 100. The air not only serves to drive oil through the passageways of the nested sleeves but also to draw oil which has collected in the chamber 109 and between the stem 50 and the intermediate sleeve member 49. In passing through the intersected spiral passageways, the oil is very finely divided and mixed with the atomizing air. The process of atomization is furthermore assisted by the spiral groove 105 whereby the mixture is given a whirling effect immediately before being discharged into an engine cylinder. With this type of atomizer, it will be apparent that fuel oil is caused to pass through tortuous passageways and to contact with surfaces exposed to the impact of high velocity air so that air and oil become thoroughly intermingled and the oil is very finely divided.

In Figure 6, I show a modified form of atomizer at 51' consisting of superposed channel rings 113 and 114 having staggered openings 115 and 115'. The channel rings 113 and 114 are supported by a head member construction 104' in a manner already described and the uppermost channel member 113 has resting thereon a spacing member 116 fitting at its top against the lower end of a sleeve member 111, as hereinbefore referred to, and the spacing member 116 has openings 49'' which afford communication between the annular oil inlet passageway defined by the valve stem 50 and the intermediate sleeve member 49 and the top of the atomizer at 51'. The spacing member 116 has a bottom portion 116' adapted to rest against the tops of the flanges of the uppermost channel ring member 113 and it is provided with a channel portion 117 having apertures 118 in the bottom thereof which afford communication between the channel 117 and the uppermost channel ring 113. With this type of construction, oil and air pass through staggered passageways and become thoroughly mixed, after which the mixture passes through grooves in the head or plug member 104' and is discharged to an engine cylinder in the manner already referred to.

To facilitate construction of the stem member 34, I show it made with a separable lower shell or cup member 34' threaded to the member 34 proper and having its lower end additionally supported by a flange 54' on the nipple 54.

From the foregoing, it will be apparent that I have devised a valve cage which is peculiarly suitable for an engine cylinder of the bottle-shaped type, such as disclosed and claimed in my application aforesaid, having no valve opening or passages at the head end thereof, all of the necessary valves including the scavenge air valve, the fuel injection valve, the air starting valve, and the safety relief, and indicator valve being carried by a unitary cage structure which is designed to fit within the neck portion of a cylinder of this type. Furthermore, the scavenge air valve is so designed as to discharge an annular column of air which is directed in such a way as to cooperate effectively in cooling the interior flaring surface of the combustion space. Also, the arrangement of cooling the valve seat for the scavenge valve and the provision of a stationary stem between the sleeve of the scavenge valve and the injection valve, such stem being adequately water cooled, provides for cooled valve seats and avoids the possibility of cracking or dissociation of oil above the injection valve.

Having thus described the invention, what I claim as new and desire to secure by Letters Patent is:

1. In an internal combustion engine having a cylinder, the combination of valve mechanism for the cylinder comprising a hollow stem fixed with respect to the cylinder and having its inner end fully exposed to the combustion space of the latter to provide a valve seat opening directly into the combustion space, a valve cooperating with said seat, a single scavenge valve seat co-axial with respect to and spaced outwardly from said stem and opening directly into the combustion space of the cylinder, and an annular scavenge valve having an inner portion slidable externally of and on said stem and having an outer portion provided only at its outer edge with an annular seat part for cooperation with said scavenge valve seat.

2. In an internal combustion engine having a cylinder, the combination of valve mechanism for the cylinder comprising a hollow stem which is stationary with respect to the cylinder and having its inner end fully exposed to the combustion space to provide a valve seat opening directly into the combustion space, a valve cooperating with said seat, a single scavenge valve seat co-axial with respect to and spaced outwardly of said stem and opening directly into the combustion space of the cylinder, an annular scavenge valve member consisting of an inner portion slidable externally of and on said stem and of an outer portion having an annular valve seat part only at its outer edge for cooperation with said scavenge valve seat, and packing means arranged between said inner portion of the scavenge valve member and the stem.

3. In an engine, the combination of a cage body having an air passage terminating in a valve seat at the lower end of the cage, means fixed to the cage body and arranged coaxially with respect to the valve seat and provided with air and fuel passageways and with a valve seat at its discharge end, a mixing device for air and fuel arranged internally of said means and supplied with air and fuel from said passageways and arranged to discharge fuel mixture through said seat, a valve surrounding and slidable on said means and cooperating with the first seat, and a valve carried by said means and controlling the discharge of fuel mixture through the second seat.

4. In an engine, the combination of a cage provided with an air passage terminating in a valve seat at the lower end of the cage, a hollow stem fixed to the cage and arranged co-axially with respect to said seat, a valve seat carried by the stem, a valve cooperating with the last-named seat, water-cooling means for the hollow stem, and a valve slidable externally of the stem and cooperating with the first-named seat.

5. In an engine, the combination of a cage provided with an air passage terminating in a valve seat at the lower end of the cage, a depending sleeve member fixed to the cage and arranged co-axially with respect to said seat, a valve seat carried by the stem, a valve cooperating with said seat, means for conducting cooling fluid to the lower end of the stem, means for assuring the flow of fluid received from the conducting means circumferentially of the lower end of the sleeve member, discharge means for the fluid, and a scavenge air valve surrounding the stem and cooperating with the first-named seat.

6. In an engine, the combination of a cage provided with an air passage terminating in a valve seat at the lower end of the cage, a depending sleeve member fixed to the cage, a valve seat carried by the sleeve member, a valve cooperating with the valve seat, a water inlet passage extending longitudinally of the stem and terminating in a circumferential passage having a partition therein, a second circumferential passage arranged above the first circumferential passage and communicating with the latter at the side of the partition opposite to the water inlet passage, a partition in the second circumferential passage, a water outlet passage extending longitudinally of the stem and communicating with the second circumferential passage at the side of the partition opposite to the inlet to said second circumferential passage, and a valve surrounding the stem and cooperating with the first-named seat.

7. In an internal combustion engine having a cylinder, the combination of inner and outer sleeves fixed with respect to the cylinder and the inner end of the outer sleeve extending inwardly beyond the inner end of the inner sleeve and said inner end of the outer sleeve terminating in a valve seat, a valve cooperating with said seat, means for supplying liquid fuel to the interior of said inner sleeve, means for supplying atomizing air to the space between the sleeves, an atomizer arranged within the outer sleeve between the valve seat and the inner end of the inner sleeve, means defining a scavenge air chamber about the outer sleeve, a scavenge valve seat at the inner end of the chamber, and a scavenge valve having an inner portion slidably engaging said outer sleeve and having an outer valve portion cooperating with said seat.

8. In an engine having a cylinder, the combination of a hollow cage fixed to the cylinder and having a valve seat opening into the combustion space of the cylinder, a bearing carried by the cage and arranged above the seat and coaxially of the latter, a hollow stem fixed to the cage and having a valve seat at its inner end opening directly into the combustion space of the cylinder, a valve cooperating with the last-named seat, and a scavenge air valve surrounding the stem, fitting in the bearing and cooperating with the first-named seat.

9. In an engine, the combination of a hollow cage having a valve seat at its lower end, a bearing above the seat arranged co-axially with respect to the latter and connected to the cage by integral arms, a hollow stem carried by the cage and arranged co-axially of the bearing and of the seat, means for water-cooling the lower end of the hollow stem, fuel injection means carried by the hollow stem, a valve cooperating with the seat and having a sleeve portion fitting in the bearing and surrounding the stem, and means co-operating with the sleeve portion of said valve for opening and closing the latter.

10. In an engine, the combination of a hollow cage member having a valve seat at its lower end, inner and outer sleeve members carried by the cage and arranged co-axially of said seat, an atomizer carried by the outer sleeve member below the lower end of the inner sleeve member, a valve seat carried by the lower end of the outer sleeve member, a valve cooperating with said seat, a stem carried by the valve and extending through the atomizer and the inner sleeve member, said stem and inner sleeve member and the inner and the outer sleeve members defining annular passageways for conducting fuel and air to the atomizer, and a valve slidable externally of the outer sleeve member and cooperating with the first-named seat.

11. In an engine, the combination of a hollow cage having an air inlet above its lower end and a valve seat at its lower end, said cage having a cover portion, a sleeve fixed to the cover portion and co-axially arranged with respect to said seat terminating in a fuel valve seat, a fuel injection valve cooperating with said fuel valve seat, said fuel injection valve having an operating stem extending through the sleeve above the cover portion, a scavenge air valve surrounding the sleeve and adapted to cooperate with said seat, and operating means connected to the scavenge air valve and extending above the cover portion.

12. In an engine, the combination of a member having a fuel supply passage terminating in a valve seat, a valve cooperating with said seat, a plurality of superposed, circumferentially-extending, communicating cooling channels in the member and disposed adjacent to said seat, means provided in the member for supplying cooling fluid initially to the channel contiguous to the seat for passage circumferentially through the passages in series, and outlet means provided in the member and communicating with the final circumferential passage.

13. In an engine, a fuel valve comprising a member having an interior fuel passage terminating in a valve seat, a circumferential cooling space contiguous to said seat, a diaphragm for dividing the space into superposed circumferentially extending passages, means for interrupting the lower passage, means for admitting cooling fluid adjacent to one side of said interrupting means, interrupting means in the upper passage, means for affording communication between the passages at the other side of the lower passage interrupting means and at one side of the upper passage interrupting means, and outlet means for the upper passage communicating therewith at the other side of its interrupting means.

14. In an engine, the combination of a water cooled stem having a central fuel supply passage terminating in a valve seat, a valve cooperating with said seat, a scavenge valve seat surrounding and spaced outwardly from said stem, and a scavenge valve having an inner hollow portion slidable on the water cooled stem and an outer valve portion for cooperation with said scavenge valve seat, the lower end of said stem and the lower interior end of said hollow portion having opposed conical surfaces in order that carbon accumulations may be readily detached.

15. In an internal combustion engine of the Diesel type, the combination of scavenge air supply means terminating in a valve seat, a stem fixed to the engine structure and coaxially disposed with respect to said seat, and a scavenge valve consisting of an outer peripheral portion having a seat cooperating with the first seat joined by an upwardly-extending spherical portion to a bearing portion in slidable engagement with respect to the exterior of said stem.

In testimony whereof I hereunto affix my signature this nineteenth day of February, 1924.

ARTHUR JACKSON WEST.